United States Patent Office 3,154,548
Patented Oct. 27, 1964

3,154,548
PROCESS FOR PREPARING 2-AMINO-s-TRIAZINE-1-OXIDES
Kenneth Robert Huffman, Stamford, Conn., and Frederic Charles Schaefer, Munich-Solln, Germany, assignors to American Cyanamid Company, Stamford, Conn., a corporation of Maine
No Drawing. Filed Mar. 5, 1963, Ser. No. 262,861
5 Claims. (Cl. 260—249.5)

This invention relates to a process for preparing 2-amino-s-triazine-1-oxides. More particularly, it relates to a process for preparing 2-amino-s-triazine-N-oxides having substituents in the 4- and 6-positions of the triazine nucleus.

J. T. Shaw in J. Org. Chem., 27, 3890 (1962) reports the preparation of certain 2-amino-s-triazine-1-oxides by the direct oxidation of the corresponding amino-substituted-s-triazines. While the method described there is an improvement over the oxidative procedure of C. Grundmann and H. Schroeder, Chem. Ber., 37, 747 (1954) inasmuch as a mono-N-oxide rather than a tris-N-oxide is obtained, nevertheless, the Shaw procedure is possessed of certain severe limitations. Thus, the oxidation of amino-substituted-s-triazines with a peracid such as peracetic acid generally afforded very low yields in those cases where any N-oxide was isolated. Moreover, the reaction apeared to be especially applicable for the preparation of those s-triazine-1-oxides wherein one electron withdrawing group is on the ring. Thus, 2-amino-s-triazine-1-oxides having a trichloromethyl or trifluoromethyl substituent in the 6-position may be readily prepared by the Shaw procedure. It should be noted, however, that the Shaw procedure is principally directed to the preparation of those s-triazine-1-oxides having an amino group or substituted amino group in each of the 2- or 4-positions of the nucleus. In view of the rather limited application of the Shaw procedure, the need has existed for a process for the preparation of 2-amino-s-triazine-1-oxides by which a large number of such compounds may be readily prepared in good yield.

It has now been discovered that 2-amino-s-triazine-1-oxides of the formula:

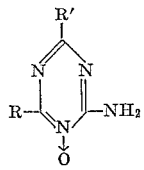

in which R is selected from the group consisting of alkyl, halo- and aryl-substituted alkyl, aryl and halo-, nitro-, and alkyl-substituted aryl and R' is selected from the group consisting of alkyl, hydroxy- and aryl-substituted alkyl, aryl and halo-, nitro- and alkyl-substituted aryl may be prepared by a simple method affording the compounds in good yields.

In accordance with the present invention, it has been found that 2-amino-s-triazine-1-oxides of the formula hereinabove may be prepared by the reaction of an N-cyanoimidate with an amidoxime in an inert reaction medium at temperatures of from about 0° to about 100° C. and preferably from about 70° to about 90° C. according to the following equation:

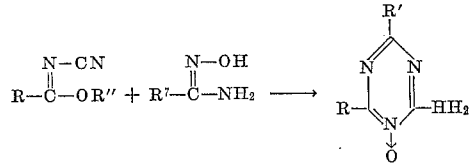

in which R and R' are as defined hereinabove and in which R'' is lower alkyl, e.g., methyl, ethyl, propyl, isopropyl, butyl and isobutyl.

The reactant N-cyanoimidates which are employed in the process of this invention are described and claimed in copending application Serial No. 262,851, filed concurrently herewith by Frederic Charles Schaefer and Kenneth Robert Huffman. This copending application also discloses and claims processes for preparing N-cyanoimidates by reaction of an ortho ester with cyanamide in the presence of an acid or acid anhydride, by reaction of a ketone acetal with cyanamide, by reaction of an imidate hydrohalide with cyanamide, and by reaction of an imidate with a cyanogen halide.

Suitable N-cyanoimidates which may be employed in the process of this invention are methyl N-cyanoacetimidate, ethyl N-cyanoacetimidate, methyl N-cyano-2-phenylacetimidate, methyl-2-chloro-N-cyanoacetimidate, ethyl 2-chloro-N-cyanoacetimidate, methyl N-cyanobenzimidate, and the like.

The reactant amidoximes are readily prepared by methods described by F. Tiemann and P. Kruger, Ber., 17, 1685 (1884); H. Schiff, Ann., 321, 357 (1902) and R. Lenaers, C. Moussebois and F. Eloy, Helv. Chim. Acta, 45, 441 (1962).

Suitable amidoximes which may be employed in the process of this invention are acetamidoxime, propionamidoxime, butyramidoxime, lactamidoxime, benzamidoxime, p-chlorobenzamidoxime, and the like.

In carrying out the process of this invention, the N-cyanoimidate is mixed with an equimolar amount of an amidoxime in an inert reaction medium such as methanol, ethanol and the like and the reaction mass is brought to reflux. After a suitable reaction period, usually from about one to six hours, the inert reaction medium is removed and the residue is recrystallized from appropriate solvents in a conventional manner. Further purification affords the product 2-amino-s-triazine-1-oxide in substantially high purity and in good yield.

The 2-amino-s-triazine-1-oxides prepared by the process of this invention are characterized by elemental and infrared analysis and formation of a red color with ferric chloride. The compounds prepared by the process of this invention are useful as chelating agents. Thus, the compounds are capable of combining with metallic ions, particularly iron, therefore sequestering the ions from a solution containing them.

In order to illustrate the present invention, the following non-limiting examples are given.

EXAMPLE 1

*2-Amino-4-Methyl-6-Phenyl-s-Triazine-1-Oxide*

A solution of 1.0 g. (0.010 mole) of methyl N-cyanoacetimidate and 1.4 g. (0.010 mole) of benzamidoxime in 5 ml. of ethanol is refluxed for four hours. After chilling of the reaction mass, the white crystalline product is filtered and washed with ether. The filtrate is treated to recover additional product. A total of 0.95 g. (45%) is obtained, M.P. 219–221°.

*Analysis.*—Calculated for $C_{10}H_{10}N_4O$: C, 59.39; H, 4.98; N, 27.71. Found: C, 58.99; H, 5.02; N, 27.47.

EXAMPLE 2

*2-Amino-4-Methyl-6-(1-Hydroxethyl)-s-Triazine-1-Oxide*

A solution of 1.95 g. (0.020 mole) of methyl N-cyanoacetimidate and 2.10 g. (0.020 mole) of lactamidoxime in 5 ml. of methanol is refluxed for 2.5 hours and evaporated to dryness. Recrystallization of the solid residue from acetonitrile gives 1.05 g. (31%) of tan solid which after further recrystallization from methanol has a M.P. of 172–173°.

*Analysis.*—Calculated for $C_6H_{10}N_4O_2$: C, 42.35; H, 5.92; N, 32.93. Found: C, 42.44; H, 6.22; N, 32.66.

EXAMPLE 3

*2-Amino-4,6-Dimethyl-s-Triazine-1-Oxide*

The procedure of Example 2 is repeated in all essential respects except that acetamidoxime, 1.5 g. (0.020 mole), is employed in place of lactamidoxime. A good yield of 2-amino-4,6-dimethyl-s-triazine-1-oxide is obtained.

While the present invention has been described in detail as to specific embodiments thereof, it is not intended that these details constitute undue limitations upon the scope of the invention, excepting, of course, insofar as these limitations appear in the appended claims.

We claim:

1. A process for preparing a 2-amino-s-triazine-1-oxide of the formula:

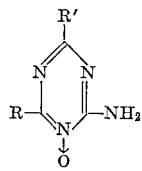

in which R is selected from the group consisting of alkyl, halo- and aryl-substituted alkyl, aryl and halo-, nitro-, and alkyl-substituted aryl and R' is selected from the group consisting of alkyl, hydroxy- and aryl-substituted alkyl, aryl and halo-, nitro- and alkyl-substituted aryl which comprises bringing into reactive contact at a temperature of from about 0° C. to about 100° C. an N-cyanoimidate of the formula:

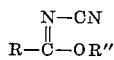

in which R is as defined hereinabove and R'' is lower alkyl with an amidoxime of the formula:

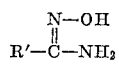

in which R' is as defined hereinabove.

2. A process as in claim 1 in which reactive contact is established in an inert reaction medium.

3. A process as in claim 2 in which R is methyl, R' is phenyl and R'' is methyl.

4. A process as in claim 2 in which R is methyl, R' is 1-hydroxyethyl and R'' is methyl.

5. A process as in claim 2 in which R, R' and R'' are each methyl.

References Cited in the file of this patent

UNITED STATES PATENTS

| | | |
|---|---|---|
| 2,729,640 | Kaiser et al. | Jan. 3, 1956 |
| 2,780,622 | Schroeder | Feb. 5, 1957 |
| 2,953,563 | Schaefer et al. | Sept. 20, 1960 |
| 3,093,645 | Shaw | June 11, 1963 |

UNITED STATES PATENT OFFICE
CERTIFICATE OF CORRECTION

Patent No. 3,154,548                 October 27, 1964

Kenneth Robert Huffman et al.

It is hereby certified that error appears in the above numbered patent requiring correction and that the said Letters Patent should read as corrected below.

Column 1, line 28, for "apeared" read -- appeared --; lines 65 to 71, in the equation, for "$R^7$" in the second compound read -- $R'$ --; same equation, for "$HH_2$" in the third compound read -- $NH_2$ --; column 2, line 12, for "ketone" read -- ketene --; column 2, line 65, for "(1-Hydroxethyl)", in italics, read -- (1-Hydroxyethyl) --, in italics.

Signed and sealed this 16th day of February 1965.

(SEAL)
Attest:

ERNEST W. SWIDER
Attesting Officer

EDWARD J. BRENNER
Commissioner of Patents